United States Patent
Mizuno

(10) Patent No.: US 9,194,420 B2
(45) Date of Patent: Nov. 24, 2015

(54) NUT ROTATION PREVENTION STRUCTURE

(75) Inventor: Shigeto Mizuno, Hino (JP)

(73) Assignee: HINO MOTORS, LTD., Tokyo (JP)

( * ) Notice: Subject to any disclaimer, the term of this patent is extended or adjusted under 35 U.S.C. 154(b) by 0 days.

(21) Appl. No.: 14/342,272

(22) PCT Filed: Aug. 24, 2012

(86) PCT No.: PCT/JP2012/071438
§ 371 (c)(1),
(2), (4) Date: Feb. 28, 2014

(87) PCT Pub. No.: WO2013/035552
PCT Pub. Date: Mar. 14, 2013

(65) Prior Publication Data
US 2014/0205393 A1   Jul. 24, 2014

(30) Foreign Application Priority Data
Sep. 8, 2011 (JP) .................................. 2011-196204

(51) Int. Cl.
*F16B 39/10* (2006.01)
*F16B 39/12* (2006.01)
*F16C 25/06* (2006.01)

(52) U.S. Cl.
CPC .............. *F16B 39/12* (2013.01); *F16B 39/103* (2013.01); *F16C 25/06* (2013.01)

(58) Field of Classification Search
CPC ......... F16B 39/12; F16B 39/103; F16C 25/06
USPC ......... 411/216, 217, 221, 190, 926, 927, 361, 411/375
IPC ...................................................... F16B 19/10
See application file for complete search history.

(56) References Cited

U.S. PATENT DOCUMENTS 374,274 A * 12/1887 Schapiro ........................ 411/201
906,476 A * 12/1908 Ullmann ........................ 411/197
(Continued)

FOREIGN PATENT DOCUMENTS

| CN | 1641233 | 7/2005 |
|---|---|---|
| DE | 515077 C3 | 1/1931 |

(Continued)

OTHER PUBLICATIONS

International Preliminary Report on Patentability for International (PCT) Patent Application No. PCT/JP2012/071438 dated Mar. 12, 2014, 5 pages.
(Continued)

*Primary Examiner* — Gary Estremsky
(74) *Attorney, Agent, or Firm* — Sheridan Ross P.C.

(57) ABSTRACT

A nut rotation prevention structure is provided with a shaft member, a nut, and a rotation prevention member. A wheel hub is supported by the shaft member. The nut is engaged through threads with a first portion of the shaft member, the first portion protruding from the wheel hub. The rotation prevention member is mounted to a second portion of the shaft member and prevents the rotation of the nut, the second portion protruding from the nut. A key groove is formed in the second portion. The rotation prevention member has a tube-shaped section and a connection section. A portion of the shaft member, the portion having the key groove formed therein, is inserted in the tube-shaped section. The connection section connects the tube-shaped member to the nut. The tube-shaped section is affixed to the key groove by staking.

2 Claims, 3 Drawing Sheets

(56) References Cited

U.S. PATENT DOCUMENTS

| | | | | |
|---|---|---|---|---|
| 945,055 | A | * | 1/1910 | Kitteredge ................ 160/82 |
| 1,077,670 | A | * | 11/1913 | Church ..................... 411/221 |
| 1,086,935 | A | * | 2/1914 | Phillippie ................. 411/192 |
| 1,229,783 | A | * | 6/1917 | Pogue ....................... 411/120 |
| 1,508,316 | A | * | 9/1924 | Brune ........................ 411/260 |
| 1,750,523 | A | | 3/1930 | Kaschtofsky |
| 3,622,185 | A | * | 11/1971 | Rosan et al. ............. 403/316 |
| 4,762,452 | A | | 8/1988 | Vogel |
| 4,770,846 | A | * | 9/1988 | Land et al. ............... 376/353 |
| 4,772,448 | A | * | 9/1988 | Popalis et al. ........... 376/463 |
| 5,035,852 | A | | 7/1991 | Land et al. |
| H1981 | H | | 8/2001 | Hennick |
| 2005/0146206 | A1 | | 7/2005 | Moreau et al. |
| 2006/0188357 | A1 | * | 8/2006 | Rowe et al. ............... 411/119 |
| 2010/0301665 | A1 | | 12/2010 | White et al. |

FOREIGN PATENT DOCUMENTS

| | | |
|---|---|---|
| DE | 2728194 | 1/1979 |
| FR | 2919361 | 1/2009 |
| GB | 2263189 | 7/1993 |
| JP | 11-10273 Y1 | 7/1936 |
| JP | H5-83451 U | 11/1993 |
| JP | 2005-351468 A | 12/2005 |

OTHER PUBLICATIONS

International Search Report prepared by the Japanese Patent Office on Oct. 2, 2012, for International Application No. PCT/JP2012/071438.

Extended European Search Report for European Patent Application No. 12830315.3, dated Apr. 1, 2015, 6 pages.

Official Action with English Summary for China Patent Application No. 201280043207.6, dated Jan. 28, 2015, 6 pages.

* cited by examiner

NUT ROTATION PREVENTION STRUCTURE

CROSS TO RELATED APPLICATIONS

This application is a national stage application under 35 U.S.C. 371 and claims the benefit of PCT Application No. PCT/JP2012/071438 filed 24 Aug. 2012, which designated the United States, which PCT Application claimed the benefit of Japanese Patent Application No. 2011-196204 filed on Sep. 8, 2011, the disclosure of each of which are incorporated herein by reference.

TECHNICAL FIELD

The present invention relates to a nut rotation restriction structure applied to, for example, a nut used to couple a wheel hub to a shaft member, such as a knuckle spindle or an axle housing.

BACKGROUND ART

In the prior art, a wheel hub is coupled to a knuckle spindle by a nut and supported to be rotatable by the knuckle spindle in a front axle portion of a vehicle. FIG. 5 is a cross-sectional view showing a coupling structure in which a wheel hub is coupled to a knuckle spindle by a nut.

Bearings 11 and 12, which are arranged in a wheel hub 10, support the wheel hub 10 to be rotatable on a knuckle spindle 14 of a knuckle 13. The knuckle spindle 14 includes a projection 14a that projects from the wheel hub 10. Male threads (not shown) are formed on an outer surface of the projection 14a. A nut 15 is fastened to the projection 14a with a predetermined tightening torque so that a proper pre-load is applied to the bearings 11 and 12.

A wheel 16 and a brake drum 17 are fixed to the wheel hub 10 by a plurality of wheel bolts 18 and wheel nuts 19. In regard to such a structure coupling the wheel hub 10 to the knuckle spindle 14, patent document 1 discloses a technique for further fixing a lock plate to the nut 15. FIG. 6 is an exploded perspective view showing in perspective the structure of each element of the nut rotation restriction structure described in patent document 1.

As shown in FIG. 6, in the nut rotation restriction structure described in patent document 1, the knuckle spindle 14 that extends in the axial direction A includes a key groove 14b, which has an opening in a distal end surface 14c of the knuckle spindle 14 and extends in the axial direction A. Three female threaded portions 20 are arranged in an end surface 15a of the nut 15 in the circumferential direction at 120° intervals. A disk-shaped lock plate 25 includes a central portion with an insertion receptacle 26 fitted to the knuckle spindle 14. An engagement piece 27, which is engaged with the key groove 14b of the knuckle spindle 14, extends toward the center from the inner rim of the lock plate 25. Further, the lock plate 25 includes eighteen bolt holes 28 arranged at 20° intervals in the circumferential direction so that three of the eighteen bolt holes 28 would be opposed to the female threaded portions 20 of the nut 15 when the engagement piece 27 is engaged with the key groove 14b.

When the wheel hub 10 is loosely coupled to the knuckle spindle 14, the nut 15 is fastened to the knuckle spindle 14 with a predetermined tightening torque that applies a proper pre-load to the bearings 11 and 12. Then, the engagement piece 27 is engaged with the key groove 14b, and the knuckle spindle 14 is fitted in the insertion receptacle 26 of the lock plate 25. Further, bolts 29 are fastened through the bolt holes 28 to the female threaded portions 20 to fix the lock plate 25 to the nut 15.

In such a structure, the engagement of the key groove 14b of the knuckle spindle 14 with the engagement piece 27 of the lock plate 25 fixed to the nut 15 restricts rotation of the nut 15. In addition, the bolt holes 28 of the lock plate 25 are arranged at narrower intervals than the female threaded portions 20 of the nut 15. This facilitates the alignment of the female threaded portions 20 with the bolt holes 28.

PRIOR ART DOCUMENT

Patent Document

Patent Document 1: Japanese Laid-Open Utility Model Publication No. 05-83451

SUMMARY OF THE INVENTION

In the rotation restriction structure described above, the lock plate 25 includes the bolt holes 28 that are formed based on the engagement piece 27, which is engaged with the key groove 14b of the knuckle spindle 14. Further, the rotation amount of the nut 15 corresponds to the predetermined tightening torque and varies accordingly. Thus, when fixing the lock plate 25 to the nut 15, the female threaded portions 20 of the nut 15 need to be aligned with the bolt holes 28 of the lock plate 25.

In this case, the engagement piece 27 of the lock plate 25 is engaged with the key groove 14b in patent document 1. Thus, the rotation amount of the nut 15 has to be adjusted. The rotation amount adjustment consequently changes the pre-load applied to the bearings 11 and 12. This may deteriorate the bearing performance, for example, the duration of the bearings 11 and 12 may be shortened and the generated heat may be increased. Moreover, to improve the assembling efficiency of the front axle, unit type bearings that include common inner and outer races for the two bearings 11 and 12 are nowadays used. In the unit type bearing, the range for the proper pre-load is extremely narrow. Thus, adjustment of the rotation amount of the nut 15 may drastically deteriorate the bearing performance. This problem is not limited to the front axle and also applies to the rear axle.

It is an object of the present invention to provide a rotation restriction structure that allows for a nut to be tightened with a predetermined tightening torque, while also restricting rotation of the tightened nut.

To achieve the above object, one aspect of the present invention is a nut rotation restriction structure including a shaft member, a nut, and a rotation restriction member. The shaft member supports a wheel hub. The nut is fastened to a first portion of the shaft member. The first portion projects from the wheel hub. The rotation restriction member is coupled to a second portion of the shaft member. The second portion projects from the nut, and the rotation restriction member restricts rotation of the nut. The second portion includes a key groove. The rotation restriction member includes a sleeve and a coupling portion. A portion of the shaft member where the key groove is formed is inserted into the sleeve. The coupling portion couples the sleeve to the nut. The sleeve is swaged and fixed to the key groove.

In the above structure, the sleeve of the rotation restriction member is swaged to the key groove to restrict rotation of the nut. In this case, the rotation restriction member is movable in the axial direction of the shaft member and the circumferential direction of the shaft member until the sleeve is swaged to the key groove. That is, the rotation restriction member coupled to the nut is movable, together with the nut, in the axial direction of the shaft member until the sleeve is swaged to the key groove. Thus, after setting the tightening position of the nut, the rotation restriction member may be fixed to the shaft member in correspondence with the position of the nut. As a result, there is no need to adjust the rotation amount of the nut when fixing the rotation restriction member to the shaft member. This allows for the rotation of the nut when tightened by a predetermined tightening torque to be restricted.

Preferably, the coupling portion is fixed by a bolt fastened to the nut.

In the above structure, the rotation restriction member is fixed to the nut by tightening the bolt. This allows for the rotation restriction member to be separated from the nut by removing the bolt from the nut. Thus, the rotation restriction member may be exchanged by disengaging the swaged portion of the sleeve from the key groove.

Preferably, the second portion of the shaft member is accommodated in the sleeve of the rotation restriction member.

In the above structure, the rotation restriction member covers the portion of the shaft member projecting from the nut (second portion). Thus, mechanical external force directed toward such a portion acts on the rotation restriction member. In this manner, the rotation restriction member protects the shaft member from mechanical external force.

Preferably, the nut has a polygonal cylindrical form. The coupling portion includes a fitting recess portion, into which the nut is fitted. An outer surface of the nut is engaged with an inner surface of the fitting recess portion to couple the coupling portion to the nut.

In the above structure, the nut is in planar contact with the coupling portion. Thus, in comparison with when the nut is in point contact with the coupling portion, the rotation force of the nut acting on the coupled locations is spread. This allows for the nut and the coupling portion to be held coupled to each other in a further stable manner even when vibration or the like of the shaft member causes the rotation force of the nut to act on the coupled locations of the nut and the coupling portion.

Preferably, the shaft member includes a third portion that projects from the sleeve. The key groove extends beyond the sleeve. The key groove includes an end located in the third portion in an axial direction of the shaft member. A portion of the key groove extending beyond the sleeve has a length in the axial direction of the shaft member that is less than a depth of the fitting recess portion.

In the above structure, even when the rotation restriction member moves in the axial direction and the swaged portion comes into contact with the end of the key groove, the nut remains fitted in the fitting recess portion. This limits separation of the rotation restriction member and the nut.

DETAILED DESCRIPTION OF THE PREFERRED EMBODIMENTS

First Embodiment

Figure 5:
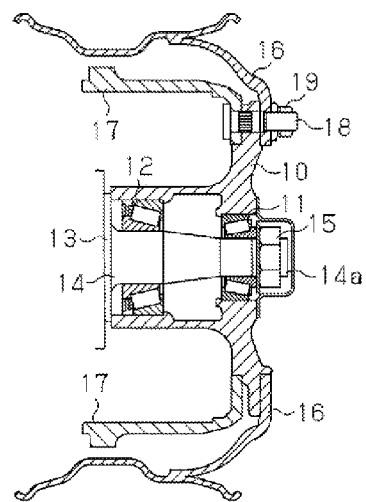
FIG. 5 is a cross-sectional diagram of a prior art example showing the cross-sectional structure around a wheel hub in a front axle.
Figure 6:
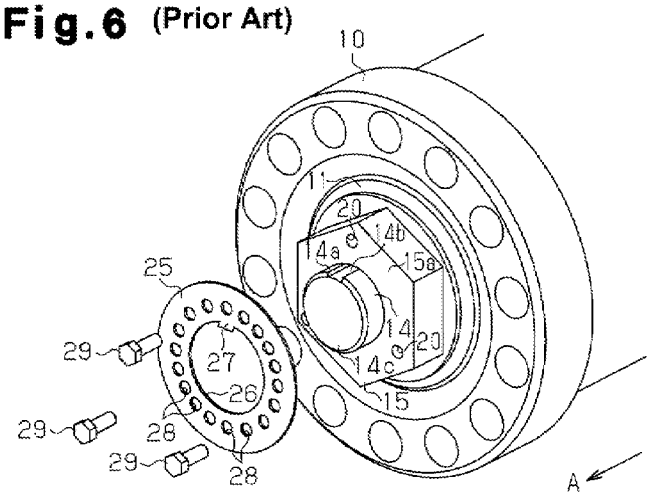
FIG. 6 is a diagram illustrating a basic structure of a nut rotation restriction structure described in patent document 1.

A first embodiment of a nut rotation restriction structure according to the present invention will now be described with reference to FIGS. 1 and 2. In the first embodiment, members that are the same as those shown in FIGS. 5 and 6 are denoted by the same reference characters and will not be described in detail.

Figure 1:
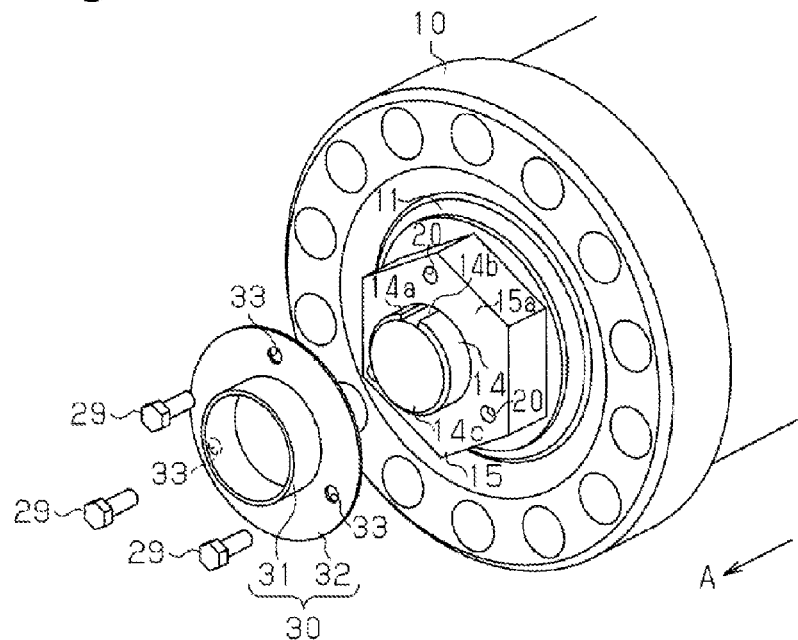
FIG. 1 is a schematic perspective view showing a nut rotation restriction structure according to a first embodiment of the present invention.

As shown in FIG. 1, in the first embodiment, a knuckle spindle 14, which serves as a shaft member rotatably supporting the wheel hub 10, includes a projection 14a, which serves as a first portion projecting from the wheel hub 10. Male threads (not shown) are formed on an outer surface of the projection 14a. The knuckle spindle 14 includes a key groove 14b that has an opening in a distal end surface 14c and extends in the axial direction A.

A nut 15, which is fastened to the male threads of the knuckle spindle 14, is a so-called hexagonal nut and includes three female threaded portions 20 that are arranged in an end surface 15a in the circumferential direction at 120° intervals.

A rotation restriction member 30, which restricts rotation of the nut 15, includes a sleeve 31, into which the knuckle spindle 14 is inserted, and a circular flange 32, which is formed integrally with one end of the sleeve 31. The sleeve 31 has a size allowing for the sleeve 31 to rotate about the axial direction A when the knuckle spindle 14 is inserted. The length of the sleeve 31 in the axial direction A is greater than the length of the projection 14a projecting from the nut 15 (length of second portion).

The flange 32, which serves as a coupling portion, includes three through holes 33 arranged in the circumferential direction at 120° intervals and respectively corresponding to the female threaded portions 20 of the nut 15. Bolts 29 are fastened to the female threaded portions 20 of the nut 15 through the through holes 33 of the flange 32 at positions where the through holes 33 are opposed to the female threaded portions 20. This fixes the rotation restriction member 30 to the nut 15. A sheet of SPCC (cold rolled steel sheet) having a thickness of 1.6 mm is pressed and shaped to integrally form the sleeve 31 and the flange 32 in order to obtain the rotation restriction member 30.

The procedures for coupling the rotation restriction member 30 will now be described with reference to FIG. 2. First, when the flange 32 is held near the nut 15, the knuckle spindle 14 is inserted into the sleeve 31. Then, the rotation restriction member 30 is rotated about the axial direction A while the knuckle spindle 14 is inserted in the sleeve 31 to align the through holes 33 of the flange 32 with the female threaded portions 20 of the nut 15. Subsequently, the bolts 29 are fastened to the female threaded portions 20 of the nut 15 through the through holes 33 of the flange 32 to fix the rotation restriction member 30 to the nut 15.

Figure 2:
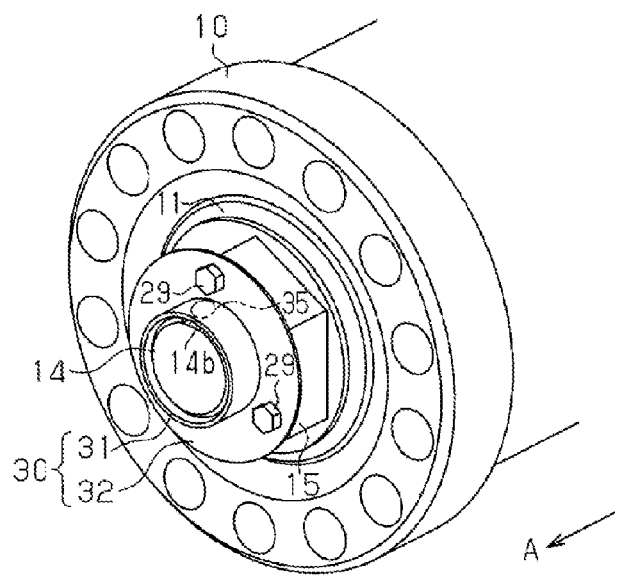
FIG. 2 is a perspective view showing a coupling portion of a rotation restriction member of FIG. 1 coupled to a nut.

Then, as shown in FIG. 2, for example, a tool such as a chisel or a hammer is used on the rotation restriction member 30, which is fixed to the nut 15, to swage a swaged portion 35, which is a portion of the sleeve 31 facing the key groove 14b, to the key groove 14b. More specifically, after fixing the rotation restriction member 30 to the nut 15, the swaged portion 35 is swaged to the key groove 14b of the knuckle spindle 14. The swaged portion 35 of the sleeve 31 that is swaged is engaged with the key groove 14b so that the rotation restriction member 30 restricts rotation of the nut 15.

The operation of the nut rotation restriction structure in the first embodiment will now be described. As described above, before swaging the swaged portion 35 of the sleeve 31 to the key groove 14b, the rotation restriction member 30 is rotated to align the through holes 33 and the female threaded portions 20 and fix the rotation restriction member 30 to the nut 15. Thus, when fixing the rotation restriction member 30 to the nut 15, there is no need to adjust the rotation amount of the nut 15 that has been tightened with the predetermined tightening torque.

Further, the rotation restriction member 30 is fixed to the nut 15 by the bolts 29. This restricts movement of the rotation restriction member 30 away from the nut 15 in the axial direction A.

The sleeve 31 is formed so that the length in the axial direction A is greater than the length of the projection 14a, which projects from the nut 15. Thus, when the rotation restriction member 30 is coupled to the nut 15, the sleeve 31 covers the outer surface of the projection 14a. This allows for the side surface of the knuckle spindle 14 to be protected from mechanical external force.

A nut in which the female threaded portions is coated with a resistance material formed from, for example, a resin has been applied as a nut of which rotation is restricted after being tightened. When this nut is tightened, the resistance material is deformed. The deformation increases the rotation resistance of the nut and restricts rotation of the nut. Further, the sleeve 31 described above may be formed integrally with the nut 15.

Rotation of these nuts is restricted when tightened by a predetermined torque. However, the rotation restriction always partially deforms the nut. Deformation of the nut, regardless of whether it is partial, drastically lowers the mechanical reliability of the nut. Thus, once the nut is removed from the knuckle spindle 14, the nut should not be used again. In other words, when the nut has to be removed from the knuckle spindle 14, for example, to perform an inspection on the vehicle, a new nut has to be prepared.

The nut fastened to the knuckle spindle 14 is relatively large and expensive. Thus, when the nut needs to be exchanged whenever removed from knuckle spindle, a heavy burden would be imposed on the vehicle owner.

In this regard, with the above-described structure, partial deformation of the nut 15 does not occur when coupling the nut 15 to the knuckle spindle 14. Thus, the nut 15 may be used again. Although the rotation restriction member 30 needs to be exchanged whenever removed from the nut 15, the rotation restriction member 30 is less expensive compared to the nut 15. This reduces the burden on the vehicle owner.

The nut rotation restriction structure of the first embodiment has the advantages listed below.

(1) In the first embodiment, when the rotation restriction member 30 is fixed to the nut 15, the rotation amount of the nut 15 does not have to be adjusted after being tightened with the predetermined tightening torque. Thus, the rotation of the nut may be restricted when tightened with a predetermined tightening torque.

(2) In the first embodiment, the rotation restriction member 30 is fixed to the nut 15 with the bolts 29. This restricts movement of the rotation restriction member 30 in the axial direction A away from the nut 15.

(3) In the first embodiment, when the rotation restriction member 30 is coupled to the nut 15, the sleeve 31 covers the outer surface of the projection 14a. Thus, the outer surface of the knuckle spindle 14 is protected from mechanical external force.

(4) In the first embodiment, removal of the nut 15 from the knuckle spindle 14 requires the rotation restriction member 30, which is inexpensive, to be exchanged. However, the nut 15, which is expensive, may be used again. This reduces the burden on the vehicle owner.

Second Embodiment

A second embodiment of a nut rotation restriction structure according to the present embodiment will now be described with reference to FIGS. 3 and 4. In the second embodiment, members that are the same as those shown in FIGS. 5 and 6 are denoted by the same reference characters and will not be described in detail. Further, in the second embodiment, the method for coupling the rotation restriction member to the nut differs from the first embodiment. The different parts will be described in detail.

Figure 3:
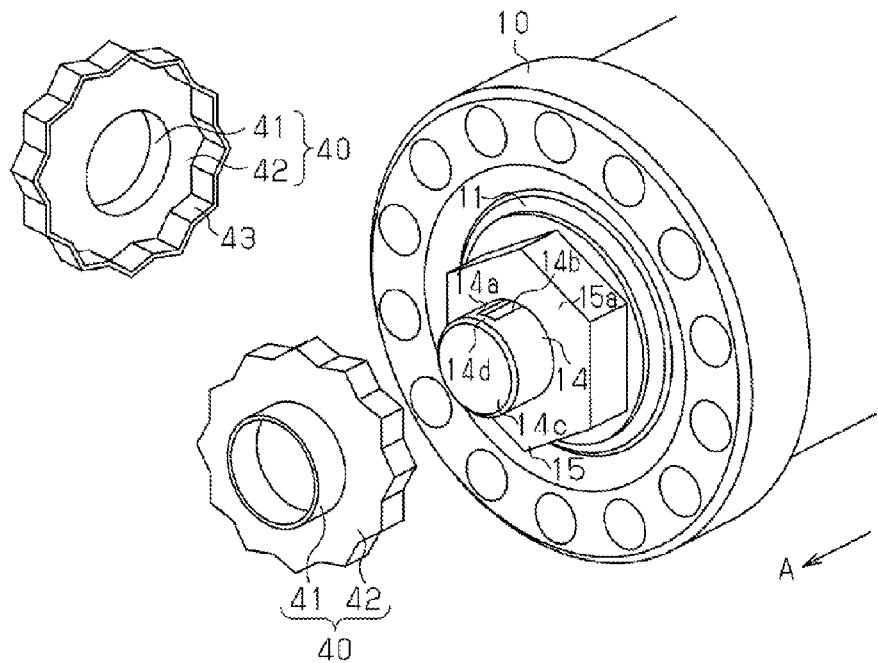
FIG. 3 is a schematic perspective view showing a nut rotation restriction structure according to a second embodiment of the present invention.

As shown in FIG. 3, in the second embodiment, the knuckle spindle 14 includes a closed portion 14d forming one end of the key groove 14b and located toward the basal end from the distal end surface 14c. The nut 15, which is a hexagonal nut, includes a flat end surface 15a, which serves as a contact surface.

A rotation restriction member 40 includes a sleeve 41, into which the knuckle spindle 14 is inserted, and a coupling portion 42, which is formed integrally with the basal end of the sleeve 41 and has the form of a polygonal prism. The side of the coupling portion 42 opposite to the sleeve 41 forms a fitting recess portion 43 into which the nut 15 is fitted. The fitting recess portion 43 has the form of a polygonal prism and includes a star-shaped polygonal bottom surface that is based on a regular dodecagon. The profile of the coupling portion 42 also has the form of a star-shaped polygonal prism conforming to the form of the fitting recess portion 43. The nut 15 is fitted to the fitting recess portion 43 so that the engagement of the outer surface of the nut 15 with the inner surface of the fitting recess portion 43 couples the coupling portion 42 and the nut 15.

The knuckle spindle 14 of the second embodiment is formed so that the distal end surface 14c is located toward the front of the sleeve 41 of the rotation restriction member 40 in the axial direction A when the nut 15 is fitted to the rotation restriction member 40. In this manner, the knuckle spindle 14 of the second embodiment includes a portion projecting from the sleeve 41 (third portion). The key groove 14b of the knuckle spindle 14 is closed at the opening in the distal end surface 14c by the closed portion 14d so that the length of a portion of the key groove 14b extending out of the sleeve 41 in the axial direction A is less than the depth of the fitting recess portion 43.

The procedures for coupling the rotation restriction member 40 will now be described with reference to FIG. 4. First, when the coupling portion 42 is held near the nut 15, the knuckle spindle 14 is inserted into the sleeve 41. Then, the rotation restriction member 40 is rotated about the axial direction A while the knuckle spindle 14 is inserted in the sleeve 41 and positioned relative to the nut 15 to fit the nut 15 to the fitting recess portion 43. When the nut 15 is fitted to the fitting recess portion 43, the rotation restriction member 40 is coupled to the nut 15.

Figure 4:
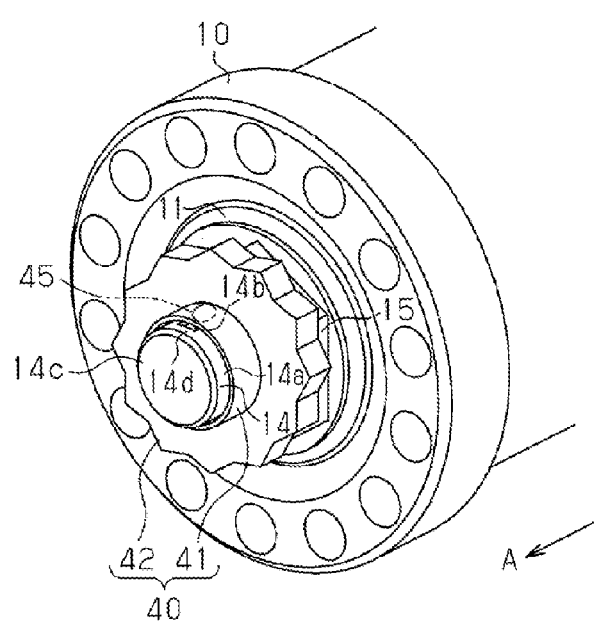
FIG. 4 is a perspective view showing a coupling portion of the rotation restriction member of FIG. 3 coupled to a nut.

Then, as shown in FIG. 4, for example, a tool such as a chisel or a hammer is used on the rotation restriction member 40 coupled to the nut 15 to swage a swaged portion 45, which is the portion of the sleeve 41 facing the key groove 14b, to the key groove 14b. More specifically, with the rotation restriction member 40, after fitting the nut 15 to the fitting recess portion 43, the swaged portion 45 of the sleeve 41 is swaged to the key groove 14b of the knuckle spindle 14. The swaged portion 45 of the sleeve 41 that is swaged is engaged with the key groove 14b so that the rotation restriction member 40 restricts rotation of the nut 15.

The operation of the nut rotation restriction structure in the second embodiment will now be described. As described above, before swaging a portion of the sleeve 41 to the key groove 14b of the knuckle spindle 14, the rotation restriction member 40 is coupled to the nut 15. Thus, when coupling the rotation restriction member 40 to the nut 15, there is no need to adjust the rotation amount of the nut 15, which has been tightened with the predetermined tightening torque. Further, the key groove 14b is formed so that when the nut 15 is fitted in the rotation restriction member 40, the length from the distal end of the sleeve 41 in the axial direction A is less than the depth of the fitting recess portion 43. As a result, even when the rotation restriction member 40 moves in the axial direction A, the swaged portion 45 of the swaged sleeve 41 comes into contact with the closed portion 14d. This limits separation of the nut 15 from the fitting recess portion 43.

As described above, the nut rotation restriction structure of the second embodiment has the advantages listed below in addition to advantages (1) and (4) of the first embodiment.

(5) The nut 15 is fitted into the fitting recess portion 43 to couple the rotation restriction member 40 and the nut 15. Thus, bolt fastening or the like does not have to be performed to couple the rotation restriction member 40 and the nut 15. This improves efficiency when coupling the rotation restriction member 40.

(6) The outer surface of the nut 15 is in planar contact with the inner surface of the fitting recess portion 43. Thus, in comparison with when the outer surface of the nut 15 is in point contact with the inner surface of the fitting recess portion 43, the coupled locations spread the rotation force of the nut 15 acting on the coupling portion 42. This allows for the nut 15 and the coupling portion 42 to be held coupled to each other in a further stable manner.

(7) The key groove 14b is formed so that the length of a portion extending out of the sleeve 41 in the axial direction A is less than the depth of the fitting recess portion 43 when the nut 15 is fitted in the rotation restriction member 40. As a result, even when the closed position 14d restricts movement of the rotation restriction member 40 in the axial direction A, the nut 15 remains fitted in the fitting recess portion 43. This prevents coupling between the nut 15 and the rotation restriction member 40 from being released.

(8) The profile of the coupling portion 42 has the form of a star-shaped polygonal prism conforming to the form of the fitting recess portion 43. Thus, the profile may be used to position the nut 15 relative to the rotation restriction member 40.

The above embodiments may be modified as described below.

In the knuckle spindle 14 of the second embodiment, the closed portion 14d may be omitted. However, it is preferable that the fitting of the nut 15 into the fitting recess portion 43 rigidly couple the rotation restriction member 40 and the nut 15 so that the rotation restriction member 40 is not moved in the axial direction A by vibration when the vehicle travels.

In the first and second embodiments, the nut 15 only needs to have a polygonal cylindrical form and does not have to be a hexagonal nut. For example, the nut 15 may be an octagonal nut. In the second embodiment, it is preferable that the profile of the coupling portion 42 be changed in accordance with the form of the nut.

In the first embodiment, the length of the sleeve 31 of the rotation restriction member 30 in the axial direction A may be less than the length of the projection portion 14a that projects from the nut 15.

In the first embodiment, the rotation restriction member is coupled to the nut 15 by fastening bolts. Further, in the second embodiment, the rotation restriction member 40 is coupled to the nut 15 by fitting the nut 15 into the fitting recess portion 43. However, the coupling method of the rotation restriction member and the nut is not limited in such manners as long as the rotation restriction member rotates together with the nut.

The invention claimed is:

1. A nut rotation restriction structure comprising:
    a shaft member that supports a wheel hub;
    a nut fastened to a first portion of the shaft member, wherein the first portion projects from the wheel hub; and
    a rotation restriction member coupled to a second portion of the shaft member, wherein the second portion projects from the nut, and the rotation restriction member restricts rotation of the nut, wherein
    the second portion includes a key groove,
    the rotation restriction member includes a sleeve, into which a portion of the shaft member where the key groove is formed is inserted, and a coupling portion, which couples the sleeve to the nut, and
    the sleeve is swaged and fixed to the key groove, and
    the coupling portion is fixed by a bolt fastened to the nut.

2. The nut rotation restriction structure according to claim 1, wherein the second portion of the shaft member is accommodated in the sleeve of the rotation restriction member.

* * * * *